United States Patent
De Bie et al.

(10) Patent No.: US 6,712,882 B1
(45) Date of Patent: Mar. 30, 2004

(54) PROCESS FOR THE PURIFICATION OF INDUSTRIAL WASTE WATER FROM A PROPYLENE OXIDE PRODUCTION PROCESS

(75) Inventors: Johan Hendrik De Bie, Amsterdam (NL); Robert Frank Dee, Amsterdam (NL); Raymond Lawrence June, Amsterdam (NL); Marinus Van Zwienen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/111,643

(22) PCT Filed: Nov. 1, 2000

(86) PCT No.: PCT/EP00/10968
§ 371 (c)(1),
(2), (4) Date: Apr. 26, 2002

(87) PCT Pub. No.: WO01/32561
PCT Pub. Date: May 10, 2001

(30) Foreign Application Priority Data
Nov. 2, 1999 (EP) ............................................. 99203616

(51) Int. Cl.⁷ .............................................. B01D 19/00
(52) U.S. Cl. .......................... 95/245; 95/250; 210/631; 210/691; 210/774; 159/17.3; 159/47.3
(58) Field of Search ........................... 95/245, 250, 241, 95/243, 251, 254, 257, 259, 263–265; 159/17.1–17.4, 47.1–47.3; 210/631, 634, 669, 690, 691, 774, 806, 909; 203/10, 12, 14, 75, 78; 585/435, 800, 858, 865, 866, 867; 528/87; 588/245; 549/529

(56) References Cited

U.S. PATENT DOCUMENTS

| | | | | |
|---|---|---|---|---|
| 4,002,525 A | * | 1/1977 | Baierl | 159/47.3 |
| 4,353,781 A | * | 10/1982 | Muschelknautz et al. | 159/2.1 |
| 5,171,868 A | * | 12/1992 | Albal et al. | 549/529 |
| 5,276,235 A | * | 1/1994 | Dubner | 549/529 |
| 5,451,300 A | * | 9/1995 | Matros et al. | 95/263 |
| 5,675,055 A | * | 10/1997 | Evans et al. | 585/858 |
| 5,830,314 A | * | 11/1998 | Mattsson | 159/17.1 |
| 6,500,310 B1 | * | 12/2002 | Dee et al. | 203/10 |

FOREIGN PATENT DOCUMENTS

| | | | | |
|---|---|---|---|---|
| DE | 23 61 236 A | 6/1975 | | B01D/1/00 |
| DE | 41 32 672 A1 | 4/1993 | | C02F/9/00 |
| JP | 59 062396 | 4/1984 | | C02F/9/00 |
| WO | 96/11299 | 4/1996 | | D21C/11/00 |

* cited by examiner

Primary Examiner—Joseph Drodge

(57) ABSTRACT

A process for treating waste water from an industrial process for producing propylene oxide, which process involves the steps of: (a) subjecting the waste water to a multi-effect evaporation treatment resulting in a vaporous top fraction and a liquid bottom fraction containing the non-volatile contaminants; and (b) condensing at least part of the vaporous top fraction into a liquid stream which is subject to a stripping treatment resulting in an overhead stream containing volatile waste organic material and purified water as the liquid bottom stream.

9 Claims, 2 Drawing Sheets

US 6,712,882 B1

PROCESS FOR THE PURIFICATION OF INDUSTRIAL WASTE WATER FROM A PROPYLENE OXIDE PRODUCTION PROCESS

This application is a 371 of PCT/EP00/10968, filed on Nov. 1, 2000 and claims the benefit of application EPO 99203616.0, filed on Nov. 2, 1999.

FIELD OF THE INVENTION

The present invention relates to a process for the purification of industrial waste water originating from a process for producing propylene oxide.

BACKGROUND OF THE INVENTION

The treatment or purification of waste water originating from industrial processes for producing propylene oxide and containing at least hydrocarbons and salts (organic and/or inorganic) normally is a relatively expensive procedure. Environmental legislation nowadays puts stringent demands on the purification of waste water streams from industrial processes, particularly when the purified waste water is to be released into the environment. Accordingly, the choice of a purification method for industrial waste water is generally bound by practical, environmental and economic considerations.

One industrial process for producing propylene oxide, wherein a relatively large amount of waste water is produced is the styrene monomer/propylene oxide (SM/PO) co-production process. In general such SM/PO process involves the steps of: (i) reacting ethylbenzene with oxygen or air to form ethylbenzene hydroperoxide, (ii) reacting the ethylbenzene hydroperoxide thus obtained with propene in the presence of an epoxidation catalyst to yield propylene oxide and 1-phenyl ethanol, and (iii) converting the 1-phenyl ethanol into styrene by dehydration using a suitable dehydration catalyst. In the last step water is produced. In addition to this reaction water organic by-products such as aliphatic and aromatic hydrocarbons, aldehydes, ketones, alcohols, phenols and organic acids are produced in the course of the entire process. Some of these by-products are separated from the main products with the aid of clean water and the organic acids are neutralized using a basic aqueous solution, such as an aqueous sodium (bi) carbonate and/or sodium hydroxide solution. Furthermore, additional water is introduced with the air in the step (i) and as steam in step (iii) of the above process, while also in other parts of the process some water may be used.

The waste water from an SM/PO production plant typically contains a total of from 1.0 to 3.5 wt % of non-salt organic compounds and from 3.0 to 6.0 wt % of organic salts. It may further contain up to 2.0 wt % of sodium carbonate and sodium bicarbonate and/or traces of sodium hydroxide, depending on the basic solution used in the neutralization of organic acids.

The input of clean water to an SM/PO plant can be up to tens of thousands kg per hour, while the output of waste water is normally about 50% higher than the input of clean water. The waste water cannot be discharged without additional purification treatment. As has already been indicated above, however, the choice of a suitable purification treatment is limited due to all sorts of practical, environmental and economic considerations.

Another well known method for producing propylene oxide, which also produces substantial amounts of waste water, is the co-production of propylene oxide and methyl tert-butyl ether (MTBE) starting from isobutane and propene. This process is well known in the art and involves similar reaction steps as the SM/PO process described above. In the epoxidation step tert-butyl hydroperoxide is reacted with propene forming propylene oxide and tert-butanol. Tert-butanol is subsequently etherified with methanol into MTBE, which is used as an additive in motor fuels.

An example of a process for treating SM/PO waste water is disclosed in U.S. Pat. No. 5,276,235. In this process the waste water is first subjected to a distillation treatment to separate water and light organic material from a concentrated aqueous waste bottom stream, subsequently admixing this bottom stream with aqueous acid, suitably sulphuric acid, then phase separating the resulting mixture into an aqueous sodium-containing phase and an organic phase and finally separately recovering the phases. In U.S. Pat. No. 5,675,055 an improved version of this process is disclosed, wherein the bottom stream recovered from the distillation step is mixed with aqueous acid and a water-immiscible organic solvent before phase separation and recovery of the phases takes place.

SUMMARY OF THE INVENTION

It would be useful to provide a method for treating industrial waste water resulting in a purified water stream which is fit for re-use in the process or can be subjected to a subsequent biotreatment resulting in water which is sufficiently pure to meet all requirements as set by environmental legislation for discharge into surface water.

Accordingly, the present invention relates to a process for treating waste water from an industrial process for producing propylene oxide, which process comprises the steps of:

(a) subjecting the waste water to a multi-effect evaporation treatment resulting in a vaporous top fraction and a liquid bottom fraction containing the non-volatile contaminants; and (b) condensing at least part of the vaporous top fraction into a liquid stream which is subjected to a stripping treatment resulting in an overhead stream containing volatile waste organic material and purified water as the liquid bottom stream.

The purified water obtained is sufficiently pure to be re-used in an industrial process as e.g. cool water, but can also be subjected to a biotreatment resulting in a pure water stream, which should be sufficiently pure for discharge into surface water.

Figure 1:
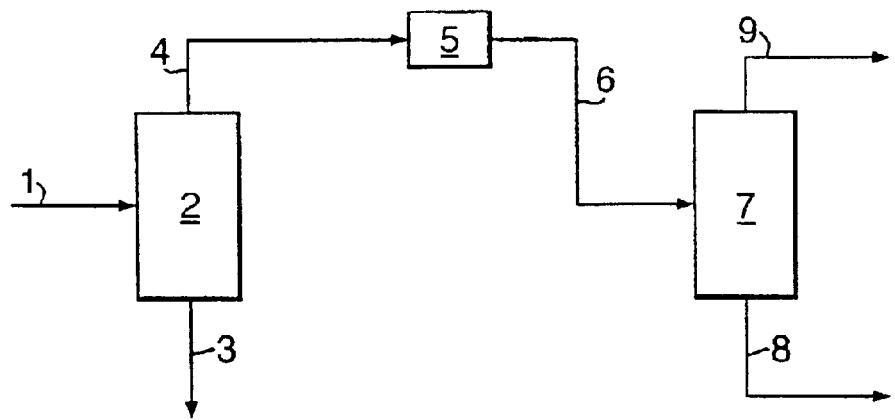
FIG. 1 schematically depicts the process of the present invention.

The waste water to be treated by the present process should preferably have a chemical oxygen demand of at least 500 ppm, preferably of at least 1000 ppm, and will normally have a phenol content of at least 10 ppm. Chemical oxygen demand (COD) is a measure of the oxygen required to oxidize all of the oxidizable materials in the sample. It is a good measure of how polluted a water sample is, because many species can be present in a water sample, each at low levels but in total contributing a significant amount of pollution. COD is determined by automated analyzers, which mix a certain amount of an oxidizing agent, such as oxygen, and optionally a catalyst to oxidize the compounds present in the sample. The carbon dioxide thus generated is measured, often by infra-red analysers, and reported in units of mg oxygen ($O_2$) consumed per litre water or in ppm $O_2$. Typical waste water discharge specifications are 100 ppm COD, as this is considered to be close to the level that is naturally present in water from decaying organic material.

The multi-effect evaporation treatment of step (a) can be carried out using a common multi-effect evaporation device. Multi-effect evaporation is a well known separation technique. It generally involves subjecting the stream to be treated to a series of evaporation treatments in subsequent effects at progressively lower pressures. Due to the pressure gradient between subsequent effects there is a resulting decrease in boiling temperature in successive effects. This gradient allows the condensing vapors from one section to be used as the heat medium for the next effect. Thus, an effect as used in this context is a section of a multi-effect evaporator heated by vapor (usually steam) and also releasing vapor to a subsequent section, where it is used to supply at least part of the evaporation heat needed. The remaining liquid (bottom) product from one effect is the (more concentrated) liquid feed to the next effect.

The multi-effect evaporation device used for the purpose of the present invention can be operated in a so called forward-feed mode: the raw feed is introduced into the first effect and is passed from effect to effect parallel to the vapor (i.e. steam) flow, while the liquid "product" is withdrawn from the last effect. It is also possible to operate the evaporation process in a so called counter current mode so that the brine is moved in a counter current fashion relative to the vapor stream through the evaporation effects. This is done so that the brine boils at progressively higher-temperatures in subsequent effects. This mode of operation is particularly advantageous if the brine has a tendency to precipitate salts as it is concentrated. Alternatively, the multi-effect evaporation may be carried out in a so called parallel mode, which involves splitting the waste water feed over the different effects of the evaporation train.

In the process of the present invention the liquid product obtained from the last effect is the brine stream containing the heavier (i.e. non-volatile) impurities. Suitably this brine stream is sent to an incinerator where the organic fraction is combusted to carbon dioxide with high efficiency. The purified vapor stream is recovered from the evaporator as the gaseous top fraction from the last effect and suitably also from the condensed intermediate vapor streams.

In general, an effect will have a vapor outlet and a liquid outlet as well as heating means for providing the evaporation heat. Such heating means could, for instance, be in the form of a reboiler arranged at the liquid (i.e. bottom) part of the effect. Alternatively, heating means can be in the form of heating surfaces like tubes or plates. All such heating means have in common that their heat input is supplied by the vapor from the previous effect. The heat supply for the first effect of a multi-effect evaporator will normally either be provided by fresh steam or by another process stream capable of providing the heat at the right temperature. The steam recovered as the top fraction from the last effect is suitably condensed. The condensate stream thus obtained can then be passed to subsequent step (b), while the condensation heat recovered can be applied elsewhere in the process or removed by a cooling medium.

The consecutive effects of a multi-effect evaporator all have the general elements outlined in the previous paragraph, but may still be of the same or of different evaporator types. Examples of evaporator types include forced-circulation evaporators, short-tube vertical evaporators, long-tube vertical evaporators, horizontal tube evaporators and wiped film evaporators. These evaporator types as well as the principles of multi-effect evaporation are well known in the art and can be found in many engineering handbooks. In this connection reference can, for instance, be made to Perry's Chemical; Engineering Handbook, $7^{th}$ edition, McGraw-Hill (1997), pages 11-108 to 11-118.

For the purpose of the present invention it has been found particularly useful to carry out the multi-effect evaporation treatment in a multi-effect evaporator comprising from two to five effects with two or three effects being particularly preferred.

If the industrial waste water to be treated stems from a SM/PO process it will normally contain traces of phenol. Phenol is a toxic chemical and hence may only be present at very low levels in the final purified water, especially when this water is to be released into surface water. Typically, phenol should be present in such purified water stream in an amount of less than 1 ppm. In the present process most of the phenol will end up in the brine stream. However, depending on the phenol level in the waste water feed some phenol will end up in the vapor fraction recovered from the multi-effect evaporation unit and hence may end up in the purified water stream. Generally, it was found that if the phenol level in the waste water feed is 30 ppm or more and it is envisaged to purify the waste water to such extent that it is suited for release into surface water, an additional treatment to remove phenol would be required. If, however, phenol levels of the waste water feed are below 30 ppm and/or the purified waste water is intended for re-use in the process and not for release into surface water, such additional phenol removal could be dispensed with.

However, in general it is preferred to remove phenol as much as possible from the waste water feed, particularly if a biotreater is used to further purify the water stream obtained by the present process because high conversion of phenol across the biotreater is required and lower feed levels will aid in this process. Therefore, it is preferred that the top fraction of at least one of the effects of the multi-effect evaporator is subjected to an alkali absorption treatment, while in an even more preferred embodiment the top fractions of all effects are subjected to such an alkali absorption treatment.

The alkali absorption treatment can in principle be carried out by any suitable way known in the art. For the purpose of the present invention, however, the alkali absorption treatment suitably comprises contacting the vaporous top fraction counter-currently with an aqueous alkali solution, preferably an aqueous sodium hydroxide (NaOH) solution, resulting in a purified top fraction. The NaOH solution preferably is a 1–20% NaOH solution in water, which is fed into the top of the absorption column while the vaporous top fraction of the effect enters at the bottom. The bottom stream recovered from the absorption column contains sodium phenolate formed from the reaction between NaOH and phenol. Suitably this bottom stream is at least partly fed to the waste water feed tank. As a result of its non-volatile character the sodium phenolate will then end up in the brine stream which is normally sent to the incinerator as will be discussed in more detail hereinafter.

Following step (a) the, possibly alkali treated, vaporous top fraction is at least partly condensed and the water condensate stream so obtained is subjected to a stripping treatment in a stripper column in step (b). Preferably at least 80 volume %, and more preferably 90 volume % or more, of the vaporous top fraction is condensed. Most preferably, however, essentially all of the vaporous top fraction is condensed. In the stripping treatment the volatile organic material still present in the water condensate stream is removed overhead, while the purified water stream is recovered as the bottom stream.

The stripper column may be any distillation column known to be suitable for stripping volatile components from a liquid stream. Suitably, however, the stripper used is a trayed or packed column having from 10 to 100 actual trays, preferably from 15 to 60 actual trays. In order to minimize the energy consumption of the overall process, it is preferred that the stripper column is operated at a pressure above the pressure at which the first effect of the multi-effect evaporator is operated. Namely, in this way it is possible to use the condensation heat of the overhead stream as the heat input to the first effect in the multi-effect evaporation treatment. With an atmospheric top pressure in the stripper, the top temperature is typically 80–100° C., depending on the amount of light organic material condensing in the overhead. The bottoms temperature is driven mainly by the pressure drop, but values of 100–110° C. are typical. In general, a range of suitable operating pressures is from 1–3 barg with corresponding bottoms temperature from 100–110° C. at 1 barg to 140–150° C. at 3 barg. The temperature in the top of the column will typically be 3 to 20° C. lower than the bottoms temperature. Reflux ratios in the stripper can be varied to achieve the desired bottoms purity, but ratios of 1/1 to 15/1 can be used with good results. Although the present process will not result in substantial foaming occurring in the stripper, which would significantly reduce the effectiveness of the stripping treatment, an anti-foaming agent may be added to the stripper to ensure that foaming will not occur. Suitable anti-foaming agents are known in the art.

Accordingly, it is preferred to condense the top fraction of the stripper column and to use the resulting condensation heat as heat input to the first evaporation section in the multi-effect evaporation treatment. The condensed top fraction containing the volatile organic contaminants originally still present in the water condensate obtained after step (a) is suitably sent to the incinerator or recycled for reuse to the process. The purified water stream recovered as the bottom stream from the stripper may be re-used as process water in an industrial process, but may also be subjected to biotreatment to further reduce the level of contaminants and to make it suitable for discharge into surface water.- Such biotreatment generally involves contacting the waste water with the appropriate micro-organisms in a biotreater. This can be effected in ways known in the art. The biotreated water thus obtained is so pure that it can be discharged into surface water. Either anaerobic or aerobic biotreatment can be used on the stream, but because of the low levels of COD present in the waste water, aerobic biotreatment is preferred. Biotreating is well known in the art and reference to typical design criteria can be found in standard engineering handbooks on waste water handling.

Although the subject process is in principle applicable to all industrial waste water streams originating from a propylene oxide production process, it is particularly useful for treatment of waste water streams originating from a SM/PO process, i.e. from a process for co-producing propylene oxide and styrene.

DETAILED DESCRIPTION OF THE FIGURES

In FIG. 1 the waste water feed 1 is subjected to an evaporation treatment in multi-effect evaporation section 2. The liquid brine stream 3 is recovered as the bottom fraction while the vapor fraction 4 from multi-effect evaporation-section 2 is condensed in condensation unit 5 resulting in a condensate stream 6. This condensate stream 6 is then subjected to a stripping treatment in stripping unit 7 resulting in a top fraction 8 containing the volatile organic contaminants and a purified water stream 9 recovered as the liquid bottom fraction. The brine stream 3 and the top fraction 8 can be sent separately or combined, after condensing said top fraction 8, to an incinerator (not depicted).

Figure 2:
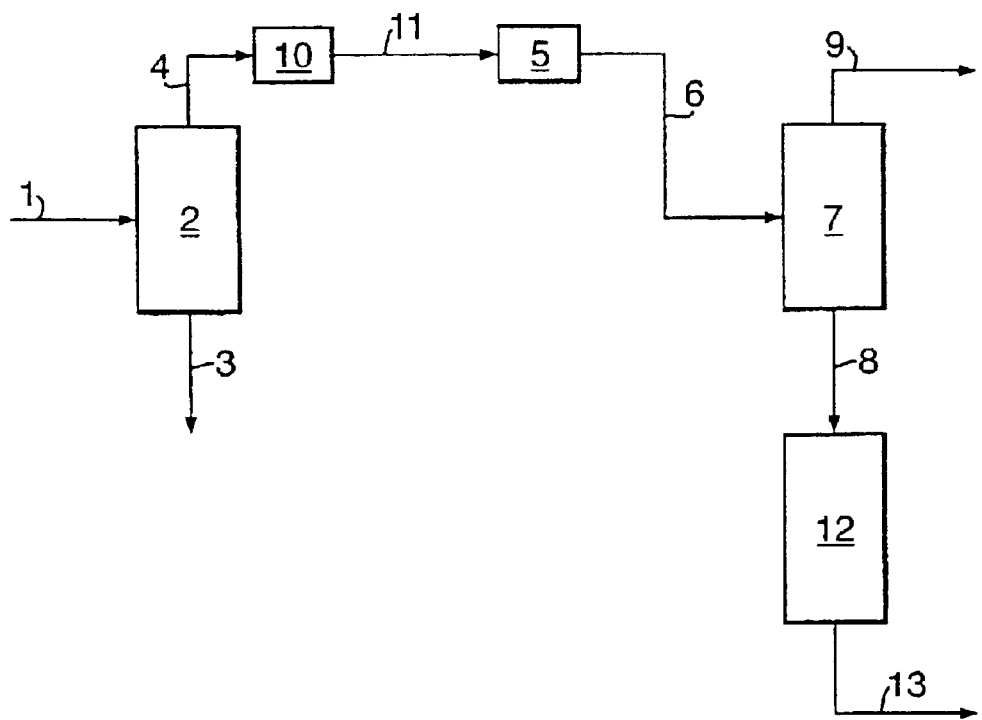
FIG. 2 depicts a preferred embodiment of the present process.

In FIG. 2 a preferred embodiment of the present process is depicted using the same reference numbers as in FIG. 1, wherein the vapor fraction 4 from multi-effect evaporation section 2 is first subjected to a caustic absorption treatment in alkali absorption unit 10 after which the treated stream 11 is condensed in condensation unit 5. Furthermore, the purified water stream 8 is subjected to a biotreatment in biotreater 12 resulting in a pure water stream 13 which can be released into the surface water.

Figure 3:
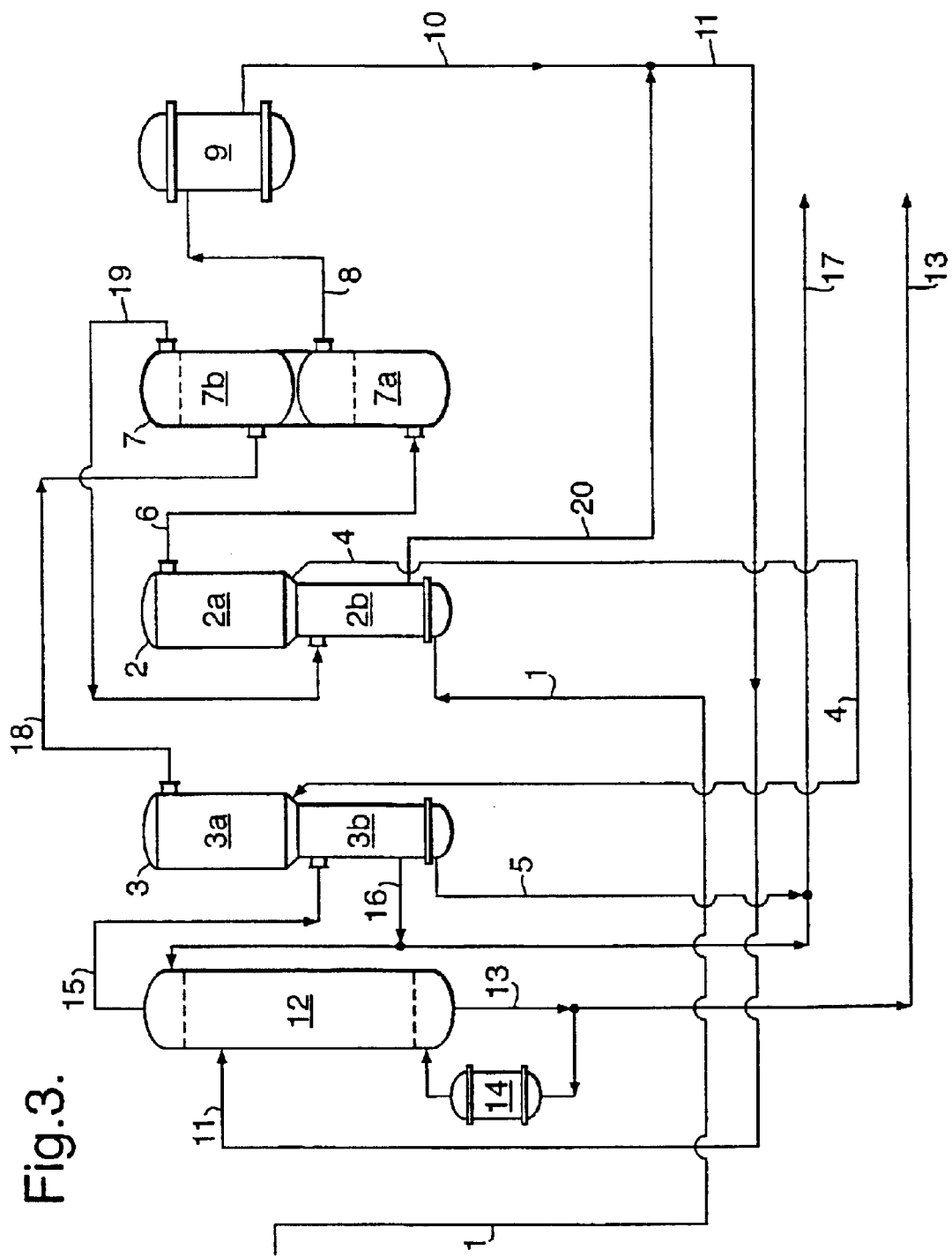
FIG. 3 shows a more detailed scheme of a preferred process in accordance with the present invention.

FIG. 3 shows a more detailed embodiment of the present process, wherein the multi-effect evaporation unit is operated in a counter current mode. The reference numbers used here do not correspond with those used in FIGS. 1 and 2. Accordingly, in FIG. 3 the waste water feed 1 enters the first effect 2 of a multi-effect evaporation unit consisting of two effects (2 and 3). The actual evaporation takes place in evaporation section 2a resulting in a first stage brine 4 and a first stage vapor fraction 6. The first stage brine stream 4 is fed into the second effect 3, where evaporation treatment takes place in evaporation section 3a resulting in a brine stream 5 and a second stage vapor fraction 18. The first stage vapor fraction 6 is subjected to a caustic absorption treatment in caustic absorber 7a of caustic absorption unit 7. The treated New vapor stream 8 is condensed in condenser 9 resulting in first stage condensate stream 10. The second stage vapor fraction 18 is also subjected to a caustic absorption treatment in caustic absorption unit 7, but in caustic absorber 7b thereof. The treated vapor stream 19 is led into the reboiler section 2b of the first effect 2, thereby releasing its condensation heat for providing the evaporation heat for the first effect 2 and resulting in second stage condensate 20. First stage condensate 10 and second stage condensate 20 are combined into condensate stream 11, which is passed into stripper 12. Here the condensate is separated into a top fraction 15 and a bottom stream 13. The top fraction 15, which contains the volatile organic contaminants, is fed to the reboiler section 3b of the second effect 3 to provide the evaporation heat for this effect. Part of the resulting condensate 16 is fed back into the top of stripper 12, while the remainder of condensate stream 16 is combined with the brine stream 5 into a combined brine 17, which can be passed to an incinerator (not shown). Part of the bottom stream 13 of the stripper 12 is reboiled in reboiler 14, while the remainder of bottom stream 13 is recovered as the purified water stream which may be further treated in a biotreater (not shown).

The invention will be further illustrated by the following example without limiting the scope of the invention to this particular embodiment.

EXAMPLE

Waste water samples from a commercial SM/PO plant were processed through a series of bench scale unit operations in accordance with the process of the present invention on a laboratory scale. The amounts of the relevant impurities in the waste water are indicated in. Table 1.

To simulate the multi-effect evaporation step, a laboratory rotovap apparatus was used. It was operated under vacuum with a still temperature between 70–80° C. The waste water was fed at a velocity of 255 grams per hour to this evaporator. The caustic absorption step was also simulated in a laboratory rotovap where a fixed amount (0.3% on feed sample) of sodium hydroxide was added to the sample along with an additional 10% of water based on the feed sample weight. The additional water formed a false bottom for the caustic absorption experiment. The caustic absorption step was performed under temperature and pressure conditions similar to the evaporation step. The condensed vapors were analyzed by gas chromatography for phenol, 1-phenyl ethanol (or methyl phenyl carbinol, MPC); methylphenyl ketone (MPK), monopropylene glycol (MPG), and 1-phenoxy-2-propanol (PPO).

Stripping of the waste water sample after caustic absorption was performed continuously in a 2.54 cm (1 inch) diameter, 35 tray Oldershaw distillation column. The feed, typically preheated to 85° C., was added on top of tray 6. The top of the distillation column was operated at atmospheric pressure. The temperature in the head of the column was typically between 99–100° C. and the bottoms temperatures were as high as 104° C. In the experiments, the split between the top and bottom of the distillation column was approximately 9% of the feed being sent overhead with the rest of the material being removed as a bottoms product. The tops material was a two phase aqueous-organic mixture which emulsified easily and on which no phase separation was attempted. Reflux ratios were controlled by an electronic timer at ratios of 3/1. The bottoms and tops material were analyzed by gas chromatography for the impurities listed above. The levels of the various contaminants listed above in the waste water feed (Feed), in the vapor fraction recovered from the evaporation treatment (vapor 1), in the water vapor after the caustic absorption treatment and in the purified water are indicated in Table 1 ("n.d." means "not detected").

TABLE 1

Waste water and purified water stream

| Component | Feed | Vapour 1 | Vapour 2 | Purified water |
|---|---|---|---|---|
| MPG (ppm) | 17800 | 551 | 41 | n.d. |
| Phenol (ppm) | 780 | 2230 | 76 | 37 |
| MPC (ppm) | 1330 | 3759 | 3852 | n.d. |
| MPK (ppm) | 330 | 748 | 748 | n.d. |
| PPO (ppm) | 150 | 102 | 98 | 48 |
| Total (ppm) | 20390 | 7390 | 4815 | 85 |

From Table 1 it can be seen that the level of contaminants is significantly reduced by the present process. A further decrease of the level of contaminants could be achieved by subjecting the purified water stream to a biotreatment, in particular to further lower the phenol content.

What is claimed is:

1. A process for treating waste water from an industrial process for producing propylene oxide, comprising:

(a) subjecting the waste water to a multi-effect evaporation treatment resulting in a vaporous top fraction and a liquid bottom fraction containing the non-volatile contaminants; and, (b) condensing at least part of the vaporous top fraction into a liquid stream which is subjected to a stripping treatment resulting in an overhead stream containing volatile waste organic material and purified water as the liquid bottom stream.

2. The process according to claim 1, wherein the purified water obtained in step (b) is subsequently subjected to a biotreatment.

3. The process according to claim 1, wherein the multi-effect evaporation treatment is carried out in a multi-effect evaporator comprising from about two to about five effects.

4. The process according to claim 1, wherein the multi-effect evaporation treatment is carried out in a multi-effect evaporator which is operated in a counter current mode.

5. The process according to claim 1, wherein the top fraction of at least one of the effects is subjected to an alkali absorption treatment.

6. The process according to claim 5, wherein the top fractions of all effects are subjected to an alkali absorption treatment.

7. The process according to claim 5, wherein the alkali absorption treatment comprises contacting the vaporous top fraction counter-currently with an aqueous alkali solution resulting in a purified top fraction.

8. The process according to claim 1, wherein the top fraction obtained from the stripping treatment is condensed and the resulting condensation heat is used as heat input to the first effect of the multi-effect evaporation treatment.

9. The process according to claim 1, wherein the waste water stream originates from a process for co-producing propylene oxide and styrene.

* * * * *